(12) United States Patent
Berkema et al.

(10) Patent No.: US 7,031,661 B2
(45) Date of Patent: Apr. 18, 2006

(54) PORTABLE WIRELESS DEVICE AND PRINT DEVICE PRINT BY REFERENCE PROTOCOL

(75) Inventors: Alan C. Berkema, Granite Bay, CA (US); Jeff Morgan, Cupertino, CA (US); Pat Stoltz, San Diego, CA (US); Todd Fischer, Boise, ID (US)

(73) Assignee: Hewlett-Packard Development, L.P., Houston, TX (US)

( * ) Notice: Subject to any disclaimer, the term of this patent is extended or adjusted under 35 U.S.C. 154(b) by 809 days.

(21) Appl. No.: 09/897,646

(22) Filed: Jun. 29, 2001

(65) Prior Publication Data

US 2003/0013413 A1    Jan. 16, 2003

(51) Int. Cl.
- G06F 3/12 (2006.01)
- H04B 5/00 (2006.01)
- H04L 12/28 (2006.01)
- H04L 12/56 (2006.01)
- H04L 29/06 (2006.01)

(52) U.S. Cl. .................. 455/41.3; 710/5; 710/36; 710/105

(58) Field of Classification Search ............... 455/41.1, 455/41.2, 41.3, 419, 420; 710/1, 5, 36, 105
See application file for complete search history.

(56) References Cited

U.S. PATENT DOCUMENTS

| 5,539,665 A | 7/1996 | Lamming |
| 5,848,413 A | 12/1998 | Wolff |
| 5,862,321 A | 1/1999 | Lamming |

(Continued)

FOREIGN PATENT DOCUMENTS

| EP | 0886206 | 12/1998 |
| EP | 0893760 | 1/1999 |
| EP | 0936 808 | 8/1999 |
| EP | 0 974 890 | 1/2000 |
| GB | 2 342 197 | 4/2000 |
| GB | 2356321 | 5/2001 |
| JP | 10191453 | 7/1998 |
| WO | 01/33365 | 5/2001 |
| WO | 01/42894 | 6/2001 |

OTHER PUBLICATIONS

Z.Pie, L. Weidong, W. Jing, W. Youzhen, "Bluetooth—The Fastest Developing Wireless Technology", IEEE, vol. 2, Aug. 21, 2000, pp. 1657–1664.

*Primary Examiner*—Harry S. Hong

(57) ABSTRACT

A wireless communication protocol for print by reference operations initiated by a portable wireless device. The protocol allows a portable wireless device, such as a handheld personal digital assistant, to initiate a print job with a printer by indicating the nature of the communication as a print by reference operation and identifying a location including print content. The protocol is preferably used as the body of an Object Exchange (OBEX) packet in a Bluetooth RF communication initiated by the portable wireless device with a Bluetooth capable print device, e.g., a printer or multi-function peripheral with a print capability. A preferred embodiment of the wireless communication protocol uses the body of an OBEX packet communicated by Bluetooth RF to include a tag identifying a packet body as being a packet body for a print by reference operation and a location identifying the location of the print content. With a preferred extensible mark-up language format, the location comprises an attribute. Additional attributes may, for example, include attributes enabling security clearance, billing identifications, use of supporting print services, and identification of alternate locations for targeted print content.

19 Claims, 3 Drawing Sheets

U.S. PATENT DOCUMENTS

| | | |
|---|---|---|
| 5,915,214 A | 6/1999 | Reece et al. |
| 5,974,416 A | 10/1999 | Anand et al. |
| 6,173,407 B1 | 1/2001 | Yoon et al. |
| 6,184,996 B1 | 2/2001 | Gase |
| 6,189,788 B1 | 2/2001 | Sherman et al. |
| 6,324,521 B1 | 11/2001 | Shiota et al. |
| 6,347,340 B1 | 2/2002 | Coelho et al. |
| 6,379,058 B1 | 4/2002 | Petteruti et al. |
| 6,400,272 B1 | 6/2002 | Holtzman et al. |
| 6,407,820 B1 | 6/2002 | Hansen et al. |
| 6,448,906 B1 | 9/2002 | Nachtsheim et al. |
| 6,452,689 B1 | 9/2002 | Srinivasan |
| 6,501,832 B1 | 12/2002 | Saylor et al. |
| 6,601,102 B1 | 7/2003 | Eldridge et al. |
| 6,738,841 B1 | 5/2004 | Wolff |
| 6,744,528 B1 | 6/2004 | Picoult et al. |
| 6,757,749 B1 * | 6/2004 | Aoki et al. ............... 710/5 |
| 6,772,338 B1 | 8/2004 | Hull |
| 6,778,289 B1 | 8/2004 | Iwata |
| 6,782,542 B1 | 8/2004 | Mein et al. |
| 6,842,460 B1 | 1/2005 | Olkkonen et al. |
| 6,857,023 B1 | 2/2005 | Rivadalla et al. |
| 2001/0016921 A1 | 8/2001 | Takahashi |
| 2001/0037462 A1 | 11/2001 | Bengtson |
| 2001/0048533 A1 | 12/2001 | Koana |
| 2002/0002592 A1 * | 1/2002 | Aoki et al. ............. 709/211 |
| 2002/0083114 A1 | 6/2002 | Mazzagatta |
| 2002/0188646 A1 | 12/2002 | Terrill |

\* cited by examiner

PORTABLE WIRELESS DEVICE AND PRINT DEVICE PRINT BY REFERENCE PROTOCOL

FIELD OF THE INVENTION

A field of the invention is wireless device communication protocols. An additional field of the invention is printing.

BACKGROUND OF THE INVENTION

Portable wireless devices such as personal digital assistant (PDA) devices and portable wireless handsets, e.g., cell phones, enjoy widespread popularity. The popularity of these devices invites attempt to expand their uses. The introduction of Internet browsing in PDA devices and wireless handset devices is an excellent example of the effort to expand the device uses. As device uses increase, commercial service opportunities increase. The introduction of Internet capabilities into the portable wireless devices permits the sale of wireless access.

The limited memory, display, and bandwidth capabilities of portable wireless devices limits commercial opportunities by restricting the type of content readily available to a wireless device user. Content is typically formatted specifically for a wireless device in a way to conserve device capabilities. Rich content is avoided in favor of bare bones content. Users will accordingly favor more traditional connections through personal computers and work stations unless circumstances such as travel prevent access to such computers. In many ways, the PDA devices and wireless handsets remain a content access method to be used for highly basic content or to access content only when circumstances prevent a user from accessing content from another device.

Printing offers the opportunity for a user to view rich content, and is often favored over viewing content through a full web browser or other application on a personal computer or work station. In contrast, the wireless devices with limited capabilities lack convenient printing mechanisms. Operations to connect the devices via a wired connection almost defeat the purpose of having a portable wireless device in the first place.

One answer to these concerns is found in efforts to have the portable wireless devices communicate with peripherals and other devices through wireless communications. The Bluetooth RF communication format, for example, is directed toward expanding the utility of portable wireless devices by providing a short range, typically about 10 meters, communication channel for communications between portable wireless devices and other Bluetooth capable devices. Standing alone, the communication channel offers little to solve the print content dilemma faced by users of portable wireless devices, though. Due to the memory and bandwidth limitations portable wireless devices are relatively poor portals to push content from or through to a printer, even with the convenience of a Bluetooth or other similar wireless communication capability.

SUMMARY OF THE INVENTION

Wireless print by reference allows a portable device to conveniently access print content by a wireless communication with a print device communicating a referenced print content to the print device, which then accesses and prints the print content. In a typical preferred example, the portable wireless device might obtain a reference to a print content, e.g., a Universal Resource Locator, while performing an operation such as web browsing over a wireless network. The present invention provides a protocol that allows a portable wireless device, such as a handheld personal digital assistant, to initiate a print job with a printer by indicating the nature of the communication as a print by reference operation and identifying a location including print content. The protocol is preferably used as the body of a Generic Object Exchange (OBEX) packet in a Bluetooth RF communication initiated by the portable wireless device with a Bluetooth capable print device, e.g., a printer or multifunction peripheral with a print capability. A preferred embodiment of the wireless communication protocol uses the body of an OBEX packet communicated by Bluetooth RF to include a tag identifying a packet body as being a packet body for a print by reference operation and a location identifying the location of the print content. With a preferred extensible mark-up language format, the location comprises an attribute. Additional attributes may, for example, include attributes enabling security clearance, billing identifications, use of supporting print services, and identification of alternate locations for targeted print content.

DETAILED DESCRIPTION OF THE PREFERRED EMBODIMENTS

Figure 1:
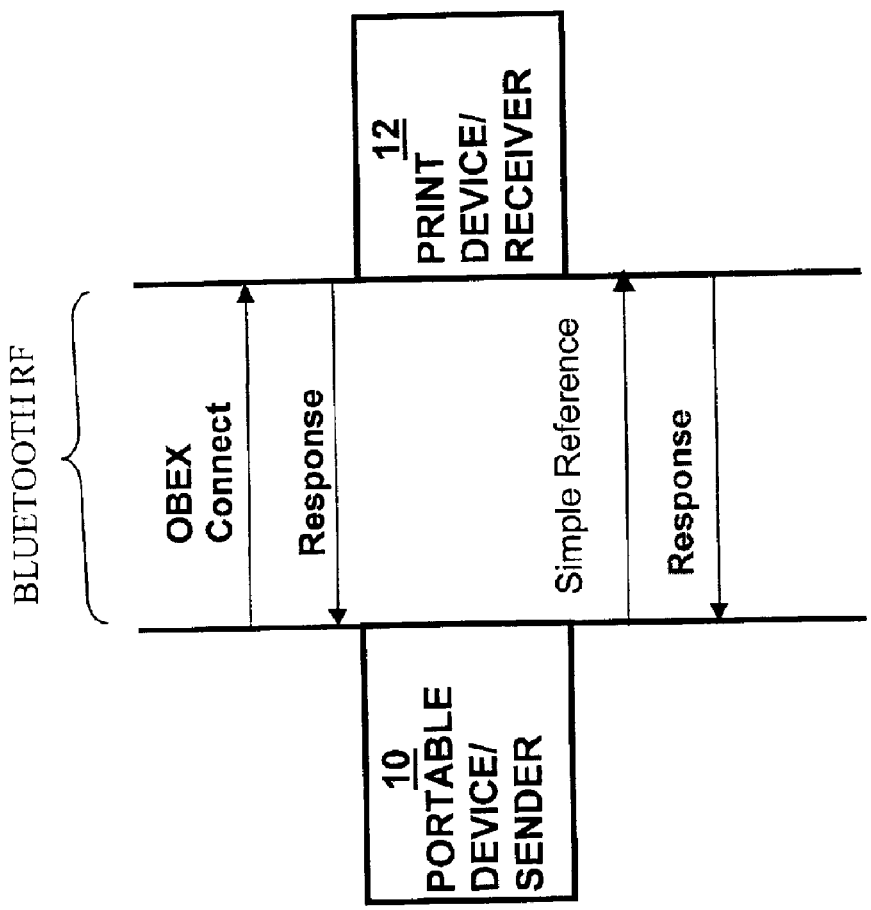
FIG. 1 is a communication flow diagram indicating a simple print by reference communication exchange in accordance with a preferred embodiment of the present invention.

A simple form of the invention is a protocol permitting, as a minimum, identification of a communication by a portable wireless device as relating to a print by reference operation and an indication of the location of the print content to be printed. An identification tag and a Universal Resource Locator meet these minimum requirements. A preferred embodiment relies upon a Bluetooth wireless communication and embeds the minimum protocol requirements in the body of a Generic Object Exchange (OBEX) packet body. Some portable wireless devices will find this level of protocol sufficient, while print devices and other portable wireless devices are more likely to benefit from an embodiment of the present protocol that allows for the communication of additional information concerning the print job, or features and services relating to the print job. The preferred embodiment protocol discussed and illustrated herein accounts for potential enhanced print by reference jobs, and features and services relating to print jobs to afford enhanced usability and commercial prospects by use of the present protocol. Artisans will appreciate, though, that the protocol in its simple form offers the ability for a print by reference to be initiated successfully by a portable wireless device with a simple identification of the print by reference nature of the communication and an identification of the location of the print content to be printed.

Bluetooth is a preferred wireless RF standard developed by a technology industry consortium made up of 3Com, Ericsson, IBM, Intel, Agere, Microsoft, Motorola, Nokia, and Toshiba with a mission of creating a standard wireless protocol. More information, including protocol specifications, can be obtained on the Bluetooth website: www.bluetooth.com, with the content available from this and linked websites incorporated herein by reference. The current Bluetooth protocol has an operable range of about 10 meters, but may sometimes prove to have greater range. As an example software/device for the underlying Bluetooth communication protocol, a Bluetooth PC card was unveiled by 3Com on May 29, 2001. The card follows the new Bluetooth 1.1 specification and uses 3Com's connection manager software.

Other example communication protocols suitable for practice within the scope of the invention that have available commercial support are those specified by IEEE 802.11 standard. 100 meters is the optimal 802.11 maximum range, but 802.11 can work at around 300 meters. However the data rate goes from Mega bits per second to about 1 or 2 Mega bits per second as range increases. Bluetooth power class III is designed for 10 meters at low power. Bluetooth Power class I uses 100 milliwatts and can go about 100 meters. Artisans will also appreciate that wireless protocols other than 802.11 and Bluetooth, e.g., infrared, might also be used and that certain preferred features, e.g., an OBEX connect are therefore unique to the preferred Bluetooth embodiment since the Bluetooth protocol requires a CONNECT while OBEX does not.

FIG. 1 shows a communication exchange adopting a preferred embodiment of the present protocol. In FIG. 1, a portable wireless device 10 initiates a wireless communication with a print device 12, which may be a printer or multi-function peripheral including a print function. The wireless communication occurs over a wireless communication channel. This is a Bluetooth wireless communication in the preferred embodiment of FIG. 1, and uses the OBEX packet exchange. The portable wireless device 10 establishes a connection with the printer via the OBEX conventions. Once the OBEX connection is established, via an OBEX connect and response exchange, the portable device 10 uses the body of an OBEX packet to conduct a simple reference push to the print device 12. The minimum information in the packet body must identify the communication as concerning a print by reference operation, and must indicate the location of the print content to be printed. The print device 12 may respond with an acknowledgment.

Figure 2:
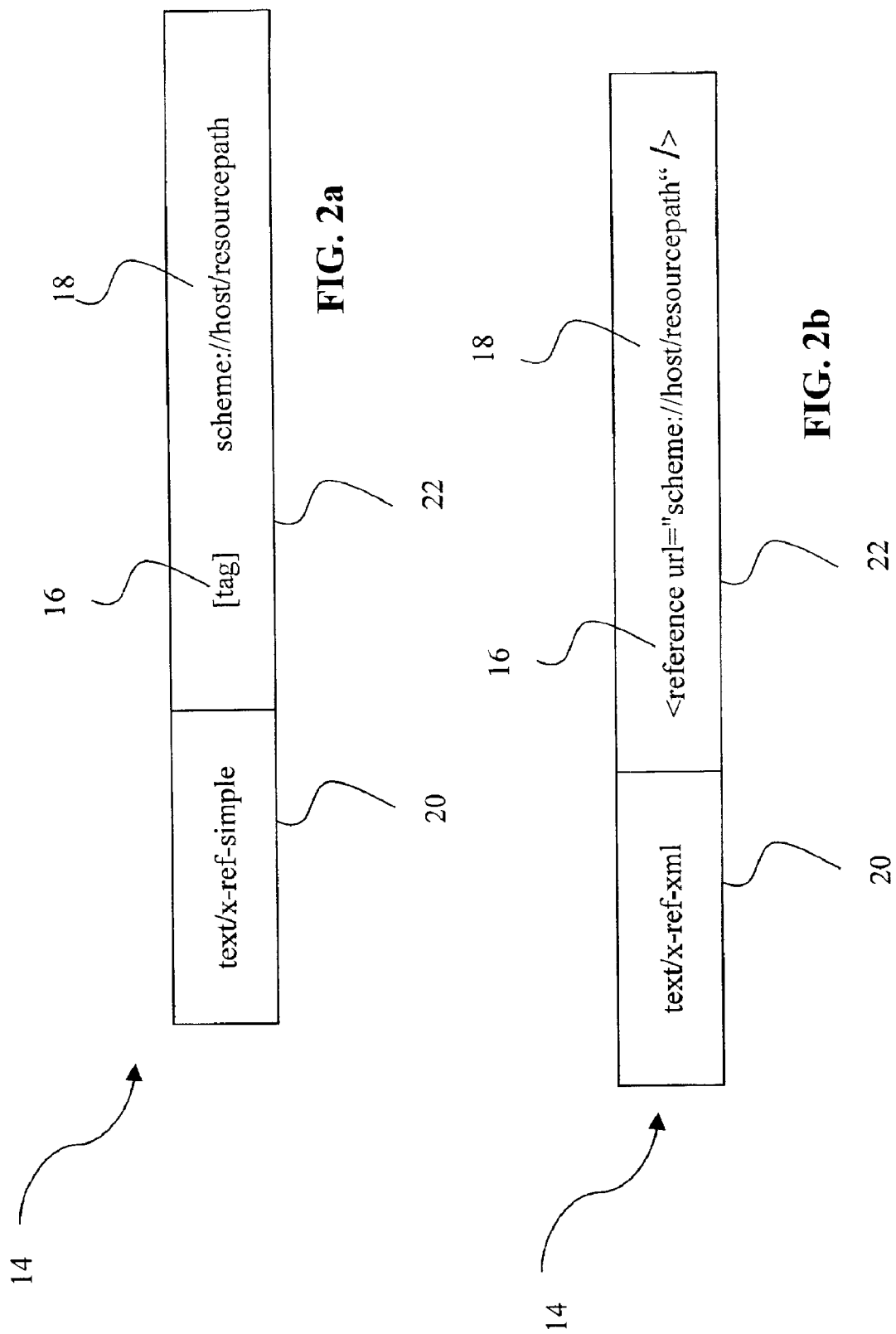
FIG. 2a illustrates a preferred OBEX simple reference packet structure for a preferred embodiment of the present protocol.
FIG. 2b illustrates a preferred OBEX XML reference packet structure for a preferred embodiment of the present protocol.

FIG. 2a shows an exemplary OBEX packet 14 including the minimum protocol information of a preferred embodiment protocol. The preferred embodiment protocol uses a tag 16 identifying the packet information as print by reference information and a Universal Resource Locator (URL) 18 identifying the location of content to be printed. A standard OBEX packet header 20 precedes the body 22 including the tag 16 and the URL 18. The nature of content to be printed as a result of this communication is essentially unlimited by the remaining capabilities of the portable wireless device 10.

A further preferred embodiment of the invention provides for enhanced control over the print by reference operation and the opportunity to tie in useful commercial features such as those relating to billing the user of a portable wireless device 10 as part of a print by reference operation or ensuring secure access to print content available for print by reference operations. Use of an extensible markup language (XML) format for the print by reference packet body, as shown in FIG. 2b using the reference numbers assigned in FIG. 2a, permits the inclusion of Meta information to be passed from the portable wireless device along with the Universal Resource Locator. The preferred XML print by reference packet body is an XML tag having the following syntax:

```
<reference url="scheme://host/resourcepath"
    attr1="attr1val" attr2="attr2val" . . .
    attrn="attrnval" \>
```

The "reference" is an XML tag and, in the above example, indicates a simple print by reference communication for printing content from a location identified by the "url" attribute following the "reference" tag. An identification of the location of the print content meets the minimum requirement, and additional attributes "attr1"—"attrn" may follow for enhanced print by reference operations. All of the attributes are optional except for the URL that must be included and be fully qualified. Table 1 defines a set of attributes used in a preferred embodiment protocol of the invention:

| Attribute Name | Comment |
|---|---|
| label | Descriptive name of the resource referred to by the reference. (e.g. label="Sales Document") |
| url | Fully qualified Uniform Resource Locator (RFC 1738) |
| use_proxy | Fully qualified URL that represents an HTTP proxy service that must be used to access the content referred to by the reference. The Port for the proxy shall be specified in the URL if not port 80 (e.g. use_proxy="http://corp_proxy:8088") |
| use_service | Fully qualified URL that represents the location of a remote print service that shall be used to process the reference. (e.g. use_service="http://myprintsvc:456") |
| ip_addr | Internet Address of the sender (portable wireless device). Provides hint to the receiver (print device) that sender (portable wireless device) is an internet device. Examples: ip_addr="126.34.07.6" ip_addr="::126.34.07.6" ip_addr="FC01:0:0:0:0:0:0:23" |
| type | Encoding of the resource referred to by the reference. (e.g type="text/html") |
| cookie | Cookie that can be used by the receiver (print device) when processing the reference. This attribute uses the general form of the HTTP Cookie Mime header NAME1=OPAQUEVALUE; NAME2=OPAQUEVALUE (e.g. cookie="CUSTOMER=WILE_E_COYOTE; PART_NUMBER=ROCKET_LAUNCHER_0001") |
| on401 | Provides the receiver (print device) with information that can be used when an HTTP 401 security challenge is encountered while processing the reference. The format of this attribute is that of the HTTP Authorization header defined in RFC2617. For example a credential that uses the "Basic" security scheme with the user id Aladdin and password "open sesame" would be encoded as follows: on401="Basic QWxhZGRpbjpvcGVuIHN1c2FtZQ=" |
| on407 | Same as on401 except used in response to a HTTP 407 proxy challenge. The format is the same as on401 |
| time | Used to signify the time the reference was sent to the Printer. Time is a byte sequence that gives the object's UTC date/time of last modification in ISO 8601 format. Local times should be represented in the format YYYYMMDDTHHMMSS and UTC time in the format YYYYMMDDTHHMMSSZ. The letter "T" delimits the date from the time. UTC time is identified by concatenating a "Z" to the end of the sequence. When possible UTC times should be used. |

-continued

| Attribute Name | Comment |
| --- | --- |
| key | The key attribute is an optional attribute that can be used to associate security information with the reference. This can be used when challenged for security information. In general such keys should be encrypted and time sensitive to prevent arbitrary delegation from compromising security. The format of this attribute conforms to the Authorization field in RFC2617 and contains both the security scheme and the encrypted key. This format is the same as on401 |
| on[status code] | This status code allows the sender (portable wireless device) to provide the receiver (print device) with an alternative URL to process in the event of a particular HTTP status code e.g. on400="http://www.bluetooth.org" The URL specified would be used in the event of a HTTP 400 status code |
| billing | This code allows for billing services. As an example, a personal wireless device can provide a billing reference number to access print content requiring payment of a fee. The billing code might also be used for other fee based transactions, e.g. payment for use of a public access printer with print by reference capabilities or payment for use of a print service identified by the "use_service" attribute. |
| new_sheet | This Boolean attribute indicates to a print device or print service that a referenced print content should be printed beginning on a new sheet of media. |

The "url" attribute is a location attribute identifying the location of the print content. The portable wireless device 10 provides the "url" attribute, e.g., "http://www.bluetooth.org" to identify the location of targeted print content to the print device 12. A fully qualified URL is preferred, though the print device 12 may be set up to resolve less complete URL designations in a manner similar to web browsers. In a contemplated use of the invention, the portable wireless device 10 obtains the URL for a print by reference by clicking on a "print" link while web browsing or reviewing other content including links.

The "label" attribute is a description attribute providing a name for the location identified by the "url" attribute. This may be a descriptive name of the resource to provide the content to be printed, for example. The descriptive name could be useful to provide track print operations, by any device associated or involved with the print by reference operation initiated by the portable wireless device.

In the preferred embodiment detailed in Table 1, the "use_proxy" attribute is a fully qualified URL that represents an HTTP proxy service that must be used to access the content referred to by the reference. The Port for the proxy is specified in the URL if it is not a default port, e.g., port 80. Ports are used in the TCP to name the ends of logical connections which carry long term conversations. For the purpose of providing services to unknown callers, a service contact port is defined. The contact port is sometimes called the "well-known port". Port number 80 is the well known port number for HTTP and the world wide web. See, e.g., http://www.iana.org/assignments/port-numbers.

Content accessed by a print by reference operation may not be in printer device format. "use_service" is an attribute identifying a location of a print service to be used in accessing the print content. The print service retrieves the content and formats the data in a format that the printer is able to print.

A print device 12 equipped with print by reference capabilities may have a reason to recognize portable wireless devices. The "ip_address" facilitates such recognition by identifying a wireless device Internet address. The "ip_address" thus provides an indication to the print device 12 receiving a wireless communication from the portable wireless device 12 with the print by reference protocol that the portable wireless device is an Internet device.

Access to a referenced print content location may be limited by any number of means to restrict access down from a level of universal public access. The preferred embodiment protocol of Table 1 provides a number of attributes to facilitate different access levels useful to assist in processing the print content as part of a print by reference operation. The "type" attribute is an encoding type attribute indicating how the print content at the location identified by the location attribute is encoded. For example, type=html or type=pdf respectively indicate html and pdf encoded content. The "cookie" attribute can associate a print by reference job with previous information concerning reference content or portable wireless device seeking to access referenced content. Thus, the cookie attribute identifying a cookie usable to process the print content at the location identified by the location attribute. Preferably, the cookie attribute uses a cookie name formatted according to HTTP Cookie MIME header name conventions.

Security is another type of access control. "on401" and "on407" are separate security attributes identifying security information that can be used in response to a security challenge. Attribute "on401" is security information that can be used in response to an HTTP 401 security challenge. Attribute "on407" is security information that can be used in response to an HTTP 407 proxy challenge. Preferably, the format of each of the HTTP 401 and HTTP 407 security attributes is in accordance with the HTTP Authorization header of RFC2617. RFC indicates an Internet standards-related specification published as part of the "Requests for Comments" (RFC) document series. The archival series is the official publication channel for Internet standards documents and other publications of the Internet community. RFCs can be obtained from a number of Internet hosts using anonymous gopher, World Wide Web, and other Internet document-retrieval systems. RFCs are published by the Internet Engineering Task Force (IETF), which is a large open international community of network designers, operators, vendors, and researchers concerned with the evolution of the Internet architecture and smooth operation of the Internet. RFCs are published by the IETF, see, e.g., http://www.ietf.org/rfc/html.

Time is useful in various security encoding or other operations. For example, time stamps are often used to authenticate communications. The "time" attribute indicates the time at which a packet is sent by the wireless device to initiate a print of print content. The preferred "time" attribute gives the wireless device's Universal Time Code date and time of last modification in ISO 8601 format. The "key" attribute associates security information with the reference tag, and is preferably an encrypted and time-sensitive key.

A print by reference operation may be impeded by a print content location that is experiencing difficulties or refuses to complete a print by reference operation. In that case, the print by reference might proceed through an alternative location including the same or substitute content. The "status code" attribute indicates an alternative location to obtain such alternative print content.

Revenue generation may arise at different points of a print by reference operation. Examples include schemes where portable wireless device users pay for access to content or pay for access to print by reference printers. Many other commercial models are possible, with the print by reference being tied to a direct payment or stemming from a related commercial or promotional transaction. Various debit and credit models of payment are facilitated by the "billing" attribute that identifies one of the wireless device 10 or user of the wireless device for billing purposes.

The "new_sheet" attribute is preferably a Boolean attribute that indicates to a print device or print service that a referenced print content should be printed beginning on a new sheet of media. As an example, new_sheet="false" indicates that a referenced print content, e.g. a document, should not start on a new sheet. This again, like all attributes excepting a reference to target print content, is a preferred option. A print device or print service handling a print by reference request from a portable wireless device 10 may have default settings for any one of the preferred set of optional attributes or other optional attributes that may be supported by a particular print device or print service. In the case of the "new_sheet" attribute, a preferred default setting is new_sheet="true".

The discussed examples generally assume a simple and single print by reference operation to print single content from a specific location. The attributes add features and Meta information to enhance or assist printing from a specific location. While a single reference print may be indicated by the "reference" tag, additional types of print by reference operations can be supported by having separate tags, e.g. "reference1", "reference2", etc. A preferred example is a tag to indicate that attributes will follow for multiple print content references, i.e., a reference list. Another preferred option is to use the packet header to indicate the type of print by reference packet body that will follow. Exemplary preferred OBEX header values for three different types of print by reference operations are defined in Table 2:

| Type Header Value | Description |
| --- | --- |
| test/x-ref-simple | Simple Reference |
| test/x-ref-xml | XML Reference |
| text/x-ref-list | Reference List |

In FIG. 2a, for example, the OBEX packet header 20 indicates the body 22 contains a simple reference for printing by reference. With a reference list, a single or multiple packets might include additional references to be processed, each of which may be a simple reference but is preferably an XML reference as in the example of FIG. 2b.

Figure 3:
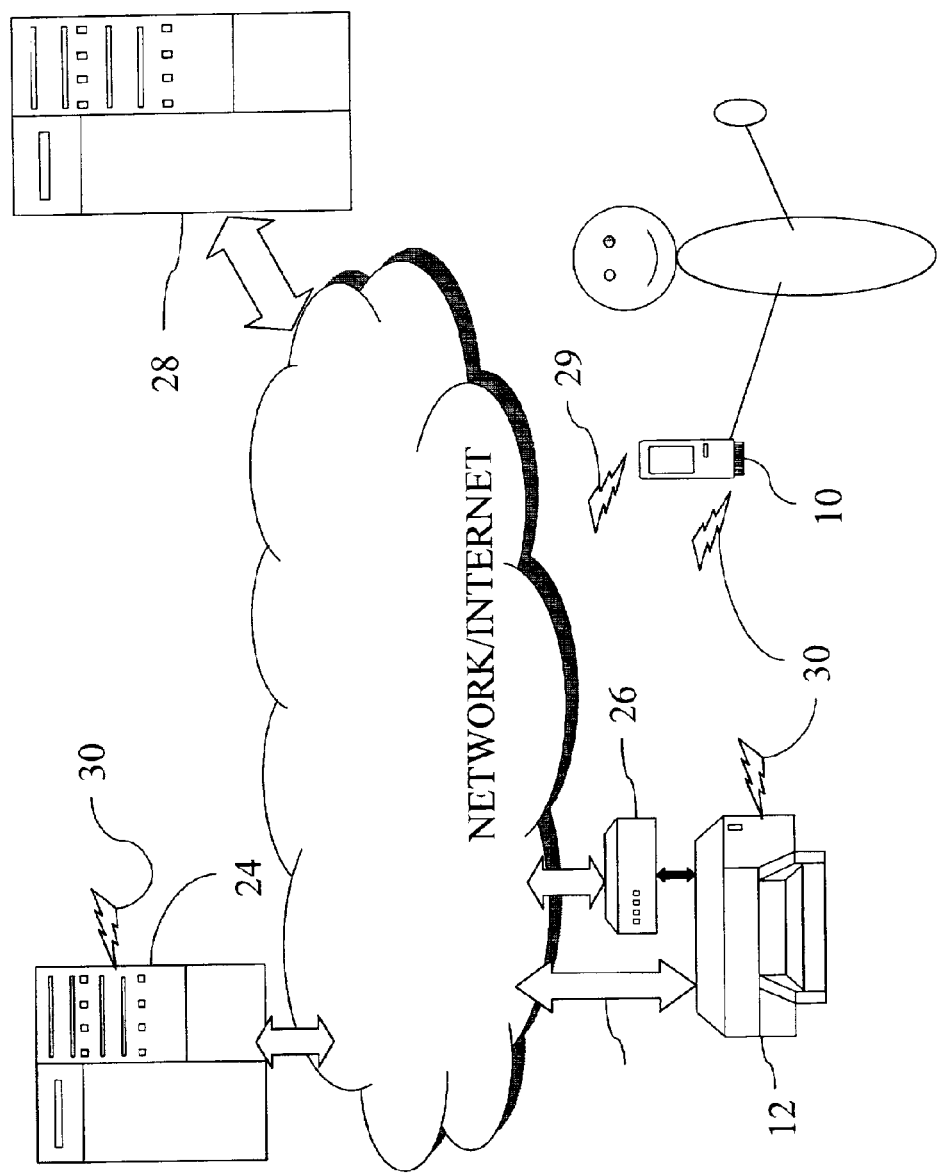
FIG. 3 illustrates a preferred environment and usage model for a protocol of the invention.

FIG. 3 shows a preferred environment and usage model in which the protocol of the invention may be used. A print device 12 accesses a print service, either via the Internet to a web site print service 24, or through another connection to a local print service 26 that may comprise software in the print device 12 when the print device 12 is carrying out a print-by-reference operation initiated by a portable wireless device 10 that connects to the print device 12 via a wireless protocol and the print by reference protocol of the invention. While the local print service 26 is shown as an external device to the print device 12, it may also be internal to the print device 12. For example, it may be native software or an add on software. It might also be installed as a firmware card.

In a preferred use, the print device 12 accepts a print by reference communication from the portable wireless device 10 and uses the print service 24 or 26 to resolve and access the content to be printed. The print service 24 or 26 executes a method that accepts, from a print client, a reference to print content targeted for printing from a location indicated by the reference. The reference is resolved to determine the location indicated by the reference. Print data is obtained from that location and transcoded into a printer ready format. The print client is allowed to access to print ready formatted data, which may be transferred to the print client in response to a request from the print client.

A likely scenario involves the portable wireless device 10 accessing a content provider 28, typically a web site over the Internet, via, for example via a cellular wireless web protocol 29. The web site might include a link to print content, such as a "print-this" link. If selected, the print by reference target is transmitted to the portable wireless device 10 via web protocol 29, which then can commence a print by reference operation with the print device 12. In the preferred environment of FIG. 3, the portable wireless device 10 uses Bluetooth wireless 30 to communicate a print by reference target to the print device 12 by the protocol of the invention.

After receiving a print by reference communication, the print device 12 then accesses the print service 24 via an Internet interface 30. However, the protocol might also be used in communications between other devices. For example, the portable wireless device 10 may use the protocol to initiate print by reference directly with one of the print service 24 or 26.

A number of paths for passing a print reference by the protocol of the invention are therefore possible. The protocol might also find use in other environments to target content for printing. Underlying communication protocols, e.g., Bluetooth, and wireless media may vary in applications of the invention. Artisans will appreciate that the simple reference communications and meta tag communication formats may be altered as necessary to suit a desired communication protocol or wireless media.

Thus, while various embodiments of the present invention have been shown and described, it should be understood that other modifications, substitutions and alternatives are apparent to one of ordinary skill in the art. Such modifications, substitutions and alternatives can be made without departing from the spirit and scope of the invention, which should be determined from the appended claims.

Various features of the invention are set forth in the appended claims.

What is claimed is:

1. A wireless communication protocol for use by a wireless device and a print device for a wireless device to initiate a print by reference operation with the print device, the protocol comprising content for the body of a packet and including:

a tag identifying a packet body as being a packet body for a print by reference operation for the wireless device to initiate a print of print content; and a location attribute identifying the location of the print content;

wherein the content for the body of the packet further comprises a description attribute providing a name for the location identified by the location attribute.

2. A wireless communication protocol for use by a wireless device and a print device for a wireless device to initiate a print by reference operation with the print device, the protocol comprising content for the body of a packet and including:

a tag identifying a packet body as being a packet body for a print by reference operation for the wireless device to initiate a print of print content; and a location attribute identifying the location of the print content;

wherein the content for the body of the packet further comprises a print service attribute identifying a location of a print service to be used in accessing the print content.

3. The protocol according to claim 2, wherein the print service attribute requires a uniform resource locator identifying the location of the print service to be used in accessing the print content.

4. A wireless communication protocol for use by a wireless device and a print device for a wireless device to initiate a print by reference operation with the print device, the protocol comprising content for the body of a packet and including:
a tag identifying a packet body as being a packet body for a print by reference operation for the wireless device to initiate a print of print content; and
a location attribute identifying the location of the print content;
wherein the content for the body of the packet further comprises an encoding type attribute indicating how the print content at the location identified by the location attribute is encoded.

5. A wireless communication protocol for use by a wireless device and a print device for a wireless device to initiate a print by reference operation with the print device, the protocol comprising content for the body of a packet and including:
a tag identifying a packet body as being a packet body for a print by reference operation for the wireless device to initiate a print of print content; and
a location attribute identifying the location of the print content;
wherein the content for the body of the packet further comprises a cookie attribute identifying a cookie usable to process the print content at the location identified by the location attribute.

6. The protocol according to claim 5, wherein the cookie attribute uses a cookie name formatted according to HTTP Cookie MIME header name conventions.

7. A wireless communication protocol for use by a wireless device and a print device for a wireless device to initiate a print by reference operation with the print device, the protocol comprising content for the body of a packet and including:
a tag identifying a packet body as being a packet body for a print by reference operation for the wireless device to initiate a print of print content; and
a location attribute identifying the location of the print content;
wherein the content for the body of the packet further comprises a security attribute identifying security information that can be used in response to a security challenge.

8. The protocol according to claim 7, wherein the security information comprises information that can be used in response to an HTTP 401 security challenge.

9. The protocol according to claim 7, wherein the security information comprises information that can be used in response to an HTTP 407 proxy challenge.

10. A wireless communication protocol for use by a wireless device and a print device for a wireless device to initiate a print by reference operation with the print device, the protocol comprising content for the body of a packet and including:
a tag identifying a packet body as being a packet body for a print by reference operation for the wireless device to initiate a print of print content; and
a location attribute identifying the location of the print content;
wherein the body of the packet further comprises:
a HTTP 401 security attribute including information that can be used in response to an HTTP 401 security challenge; and
a HTTP 407 security attribute including information that can be used in response to an HTTP 407 proxy challenge.

11. The protocol according to claim 10, wherein the format of both of the HTTP 401 and HTTP 407 security attributes are formatted according the HTTP Authorization header of RFC2617.

12. A wireless communication protocol for use by a wireless device and a print device for a wireless device to initiate a print by reference operation with the print device, the protocol comprising content for the body of a packet and including:
a tag identifying a packet body as being a packet body for a print by reference operation for the wireless device to initiate a print of print content; and
a location attribute identifying the location of the print content;
wherein the body of the packet further comprises a key attribute associating security information with the tag.

13. The protocol according to claim 12, wherein the key attribute comprises an encrypted and time-sensitive key.

14. A wireless communication protocol for use by a wireless device and a print device for a wireless device to initiate a print by reference operation with the print device, the protocol comprising content for the body of a packet and including:
a tag identifying a packet body as being a packet body for a print by reference operation for the wireless device to initiate a print of print content; and
a location attribute identifying the location of the print content;
wherein the body of the packet further comprises a status code attribute indicating an alternative location to obtain print content.

15. A wireless communication protocol for use by a wireless device and a print device for a wireless device to initiate a print by reference operation with the print device, the protocol comprising content for the body of a packet and including:
a tag identifying a packet body as being a packet body for a print by reference operation for the wireless device to initiate a print of print content; and
a location attribute identifying the location of the print content;
wherein the body of the packet further comprises a billing attribute identifying one of the wireless device and a user of the wireless device for billing purposes.

16. A wireless communication protocol for use by a wireless device and a print device for a wireless device to initiate a print by reference operation with the print device, the protocol comprising elements for:
establishing the nature of the communication as relating to a print by reference operation; and
providing a reference identifying a location of content to be printed;

wherein the reference comprises a Universal Resource Locator;

further comprising elements for:

identifying a remote print service usable to process the content to be printed;

identifying a cookie usable to process the print to be printed; and providing security information usable in response to a security challenge.

17. The wireless communication protocol according to claim 16, further comprising elements for identifying one of the wireless device and a user of the wireless device for billing purposes.

18. The wireless communication protocol according to claim 16, further comprising a key element including an encrypted and time-sensitive key.

19. The wireless communication protocol according to claim 16 further comprising a new sheet element for indicating whether the content to be printed should be printed beginning on a new sheet of media.

* * * * *

UNITED STATES PATENT AND TRADEMARK OFFICE
CERTIFICATE OF CORRECTION

PATENT NO. : 7,031,661 B2  Page 1 of 1
APPLICATION NO. : 09/897646
DATED : April 18, 2006
INVENTOR(S) : Alan C. Berkema et al.

It is certified that error appears in the above-identified patent and that said Letters Patent is hereby corrected as shown below:

On the face page, in field (73), in "Assignee", in column 1, line 1,
after "Development" delete "," and insert -- Company, --, therefor.

In column 3, line 18, delete "Mega bits" and insert -- 11 Mega bits --, therefor.

Signed and Sealed this

Nineteenth Day of May, 2009

JOHN DOLL
*Acting Director of the United States Patent and Trademark Office*